April 22, 1941. W. P. GALLAGHER 2,239,287
CUTTING MACHINE
Filed Aug. 17, 1940 2 Sheets-Sheet 2
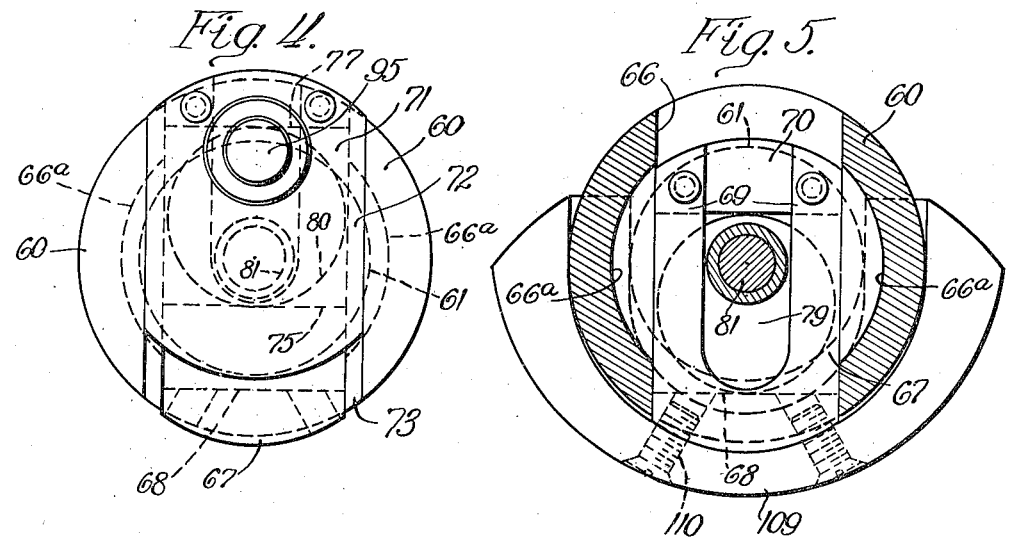
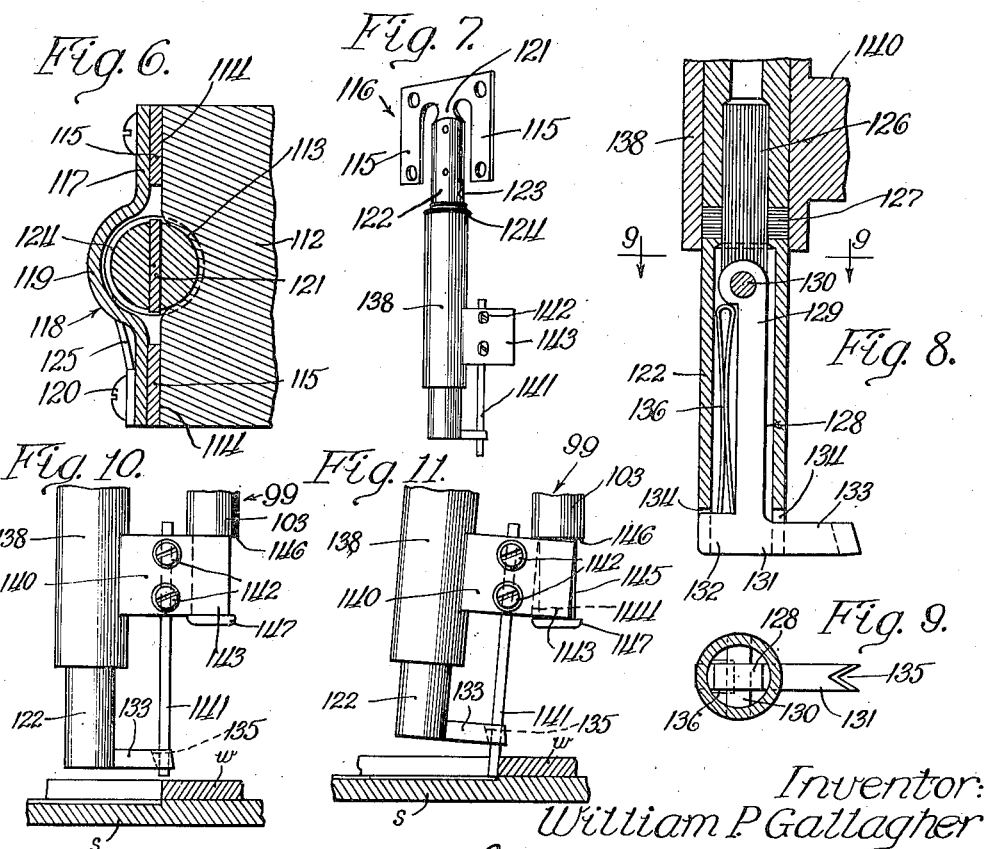
Inventor:
William P. Gallagher
By Brown Jackson Boettcher Dienner
Attys.

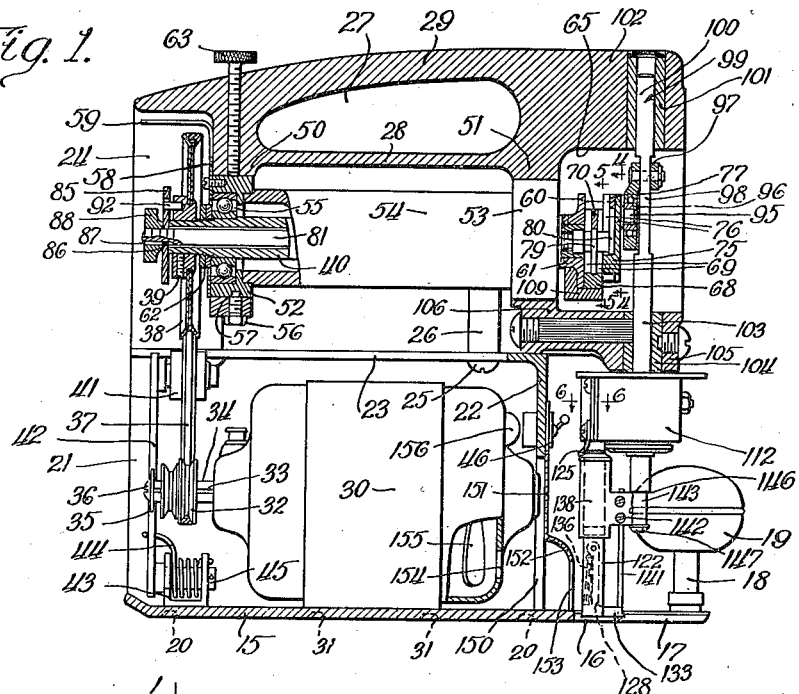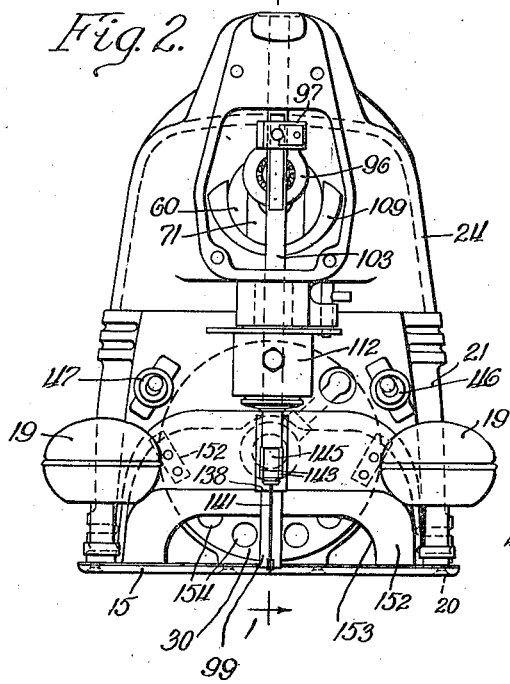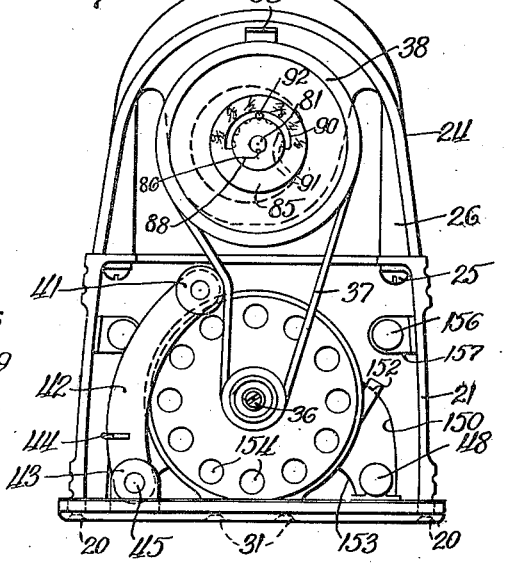

Patented Apr. 22, 1941

2,239,287

UNITED STATES PATENT OFFICE 2,239,287

CUTTING MACHINE

William P. Gallagher, Chicago, Ill., assignor to International Register Company, Chicago, Ill., a corporation of Illinois Application August 17, 1940, Serial No. 353,093

15 Claims. (Cl. 30—273)

This invention relates to cutting machines, and has to do with cutting machines of the type in which the machine is moved over the material being cut by means of a reciprocating tool connected to a plunger for reciprocation therewith and for swinging movement thereabout, the tool being eccentric to the plunger so as normally to trail the latter in the movement of the machine over the work.

A type of machine to which my invention relates is disclosed in the patent issued to Vincent V. Colby, September 25, 1934, No. 1,974,642, and the patents issued to Arthur H. Woodward, March 6, 1934, Nos. 1,949,509 and 1,949,510. The present invention is in the nature of an improvement over the machine disclosed in the latter Woodward patent, and is directed to reduction of vibration and stresses in the use of the machine, as well as to means facilitating movement of the machine over the work at increased speed while assuring smoother operation. More specifically, I provide adjustable counterweight means for counterbalancing the crank pin and reciprocating plunger and associated parts, in conjunction with means for effecting simultaneous adjustment of the counterweight and the crank pin toward and away from the axis of the shaft for driving the plunger. A further improvement comprises the provision of means normally guiding the chisel or cutting tool perpendicularly to the work while permitting limited movement of the tool in a direction opposite to that of the machine over the work, thus avoiding subjecting the tool and associated parts of the machine to objectionable stresses, while permitting increased speed in movement of the machine over the work and assuring smoothness in such movement of the machine. I also provide means for blowing away from the cutting tool chips or small particles of the material being cut, thus facilitating accuracy in operation of the use of the machine. Further objects and advantages will appear from the detail description.

In the drawings:

Figure 1 is a central vertical sectional view of a machine embodying my invention, taken from front to back thereof substantially on line 1—1 of Figure 2;

Figure 2 is a front view of the machine with the cover plate of the compartment for the crank pin and associated parts removed;

Figure 3 is a rear view of the machine;

Figure 4 is a sectional view, on an enlarged scale, taken substantially on line 4—4 of Figure 1, the crank pin being shown in end view and the counterweight being omitted for clearness of illustration;

Figure 5 is a sectional view taken substantially on line 5—5 of Figure 1, on the same scale as Figure 4;

Figure 6 is a sectional view, on an enlarged scale, taken substantially on line 6—6 of Figure 1;

Figure 7 is a perspective view of the guide rod and the mounting spring means therefor and associated parts, including the guide sleeve and foot, this view being on a reduced scale relative to Figure 6;

Figure 8 is a fragmentary lengthwise sectional view through the guide rod and the guide sleeve, on an enlarged scale, the guide foot and the associated spring being shown in side view;

Figure 9 is a sectional view taken substantially on line 9—9 of Figure 8;

Figure 10 is a side view of the lower portions of the guide rod and the plunger and the guide sleeve and tool block and associated parts, showing the normal position of the guide rod with the tool out of the work; and Figure 11 is a view similar to Figure 10 showing the positions which the guide rod and chisel and associated parts assume during the movement of the machine over the work with the chisel in the work.

The machine comprises a base plate 15 of generally rectangular shape having a planar underface of considerable area, which supports the machine upon the work for sliding movement thereover. At its forward end base plate 15 is provided with a substantially V-shaped notch 16, providing two forwardly extending projections 17 to each of which is secured a post 18 having a knob 19 secured upon its upper end. Base plate 15 is suitably secured, as by countersunk screws 20, to the bottom of a lower housing section 21 having a front wall 22 and provided, at the top of wall 22 and the top of each side wall, with an inwardly extending reinforcing flange 23. An upper housing section 24 extends over and seats upon section 22 and is secured to the latter, by screws 25 passing through flange 23 and threading into bosses 26 formed integrally with housing section 24 and projecting inward from the side walls thereof. Housing section 24 is provided with an elongated forwardly flaring opening 27 in its upper portion, with a top wall 28 below opening 27, portion 29 of section 24 above opening 27 providing a convenient handle for lifting and carrying the machine. Sections 21 and 24 together form a housing within which the working parts of the machine are mounted.

An electric motor 30, preferably a universal motor, is suitably secured, as by means of screws 31, on the upper face of base plate 15. A double pulley 32 is splined, by means of a key 33, to shaft 34 of motor 30, for rotation with this shaft and relative movement lengthwise thereof, movement of pulley 32 outward along shaft 34 being limited by an annular stop member 35 secured to the outer end of shaft 34 by a screw 36.

Double pulley 32 comprises two V pulley elements either of which may receive a V belt 37 which passes about a V pulley 38 of known type which is suitably secured, as by means of one or more set screws, one of which is shown at 39, on the rearward end of a tubular shaft 40.

Belt 37 is maintained under proper tension by means of belt tightener means comprising a roller 41 bearing against belt 37 and rotatably mounted at the upper end of an arm 42 pivoted at its lower end, by means of a pin 45, in a bracket 43 secured to the upper face of base plate 15. A torsion spring 44, coiled about pin 45, has one end hooked about the inner arm of bracket 43 and its other end hooked about the outer edge of arm 42, urging the latter inward toward the belt 37. Motor 30 is controlled by a switch 46 of suitable known type mounted on the front wall 22 of lower housing section 21, above and adjacent one of the knobs 19. A second similar switch 47 is mounted on wall 22 above and adjacent the other knob 19 and, when closed, connects a resistor 48, of known type, suitably mounted within the housing, in series with the field coil of motor 30. By means of the switches 46 and 47, which may readily be operated by the thumb while grasping knobs 19, the motor may be driven at either one of two speeds. That, in conjunction with the double pulley 32, renders it possible to drive shaft 40 at four different speeds to suit requirements or as desired.

The upper housing section 24 is provided with two interior relatively thick webs 50 and 51, defining annular supports spaced apart lengthwise of housing section 24 and disposed coaxially with their common axis in the central transverse vertical plane of housing section 24. Each of the web elements 50 receives a collar, these two collars being secured to the ends of a sleeve through which tubular shaft 40 extends, this shaft being disposed eccentrically of the sleeve and providing therewith means for adjusting the sleeve toward and away from the base plate 15. This means is substantially similar to the adjusting means disclosed in the two above identified Woodward patents, and a brief description thereof will suffice. A collar 52 is mounted for turning movement in web 50, a similar collar 53 being mounted for turning movement in web 51, the collars 52 and 53 being secured to the ends of a sleeve 54. Each collar has a ball bearing 55 of known type mounted therein eccentrically thereto, these ball bearings supporting shaft 40 for rotation within sleeve 54 in eccentric relation thereto. A dog pointed screw 56, threaded through the lower portion of web 50, engages into a circumferential groove 57 in collar 52, this groove being of appropriate length for limiting turning movement of collar 52 in either direction for effecting the desired adjustments of shaft 40 toward and away from base plate 15. An annular plate 58 is secured by screws, or in any other suitable manner, to the rearward end of collar 52, this plate being provided with a handle element 59 extending rearward beyond pulley 38, providing convenient means for adjusting the collar 52. A head 60 is pinned or otherwise suitably secured upon the forward end of shaft 40, this head being provided with a reduced neck 61 which contacts the inner race of the ball bearing within collar 53, as will be understood. Two lock nuts 62 are screwed upon the rearward portion of shaft 40, the inner one of these nuts contacting the inner race of ball bearing 55. The shaft 40 is thus confined against endwise movement relative to sleeve 54, and collars 52 and 53, and is rotatably mounted in the latter for adjustment toward and away from the base plate 15 by turning of collar 52 in proper direction, by means of the handle or lever 59. A set screw 63, threaded through the top of housing section 24 adjacent the rear of opening 27, may be turned into binding contact with collar 52 and provides convenient means for securing the latter, and hence the sleeve 54 and shaft 40, in desired adjustment.

Head 60 is disposed within a compartment 65 at the front of upper housing section 24. The head 60 is provided with a diametrical groove 66 of considerable width opening from its outer face. A counterweight block 67 is slidably mounted in groove 66 and seats against head 60 at the inner or rearward end of this groove. Block 67 is of elongated U-shape in lengthwise section, comprising a bight element 68 from which extend two parallel arms 69 spaced apart, and a filler plate 70 riveted or otherwise suitably secured between the arms 69 at the other end of the block. A crank pin block 71, similar in construction to block 67, is mounted on the outer face of the latter block for sliding movement in groove 66 of head 60. Block 71 is provided with lateral shoulders 72 the inner surfaces of which are beveled correspondingly to beveled surfaces 73 of head 60 at the outer or forward edges of groove 66, shoulders 72 seating on beveled surfaces 73. Like block 67, block 71 comprises a bight element 75 at one end thereof, two spaced parallel arms 76 and a filler plate 77 secured between arms 76 at the other end of the block. Blocks 67 and 71 receive between the arms thereof two oppositely disposed eccentrics 79 and 80, respectively, suitably secured upon an adjusting rod 81 extending through shaft 40, slidable therethrough and, under certain conditions which will be explained presently, rotatable relative to shaft 40 for varying the angular relation between the latter shaft and rod 81. Both arms of block 67 are slotted lengthwise to accommodate rod 81 and the hubs of eccentrics 79 and 80 secured thereon, and the inner or rearward arm of block 71 is likewise slotted lengthwise to accommodate rod 81 and the hub of eccentric 80 secured thereon; as will be clear from Figures 1, 4 and 5. The eccentrics 79 and 80 contact the inner end walls of blocks 67 and 71, respectively, provided by the bight element and the filler plate of each block, as will be clear from Figures 4 and 5. By turning the rod 81 in proper direction, the blocks 67 and 71 may be adjusted in opposite relation and simultaneously and to equal extent toward and away from the axis of shaft 40 along a diameter thereof. Arcuate grooves 66a in head 60, opening from groove 66, accommodate the eccentrics 79 and 80, when the latter are turned into positions projecting beyond the sides of blocks 67 and 71.

An annular adjusting plate 85 is mounted about the rearward end portion of rod 81, this plate being provided at its inner circumference with an inwardly projecting stud 86 extending into a keyway or groove 87 in rod 81, extending lengthwise of the latter from the rearward end thereof. A knurled thumb nut 88, screwing on the rearward end of rod 81, normally holds plate 85 tightly against the rearward end of shaft 40, this nut 88 providing means for forcing rod 81 rearward through tubular shaft 40, so as to clamp the blocks 67 and 71 tightly within head 60 by means of the eccentrics 79 and 80, in an obvious manner, the beveled shoulders 72 of block 71 then seating tightly against the beveled surfaces 73 of head 60 in binding contact therewith. Adjusting plate 85 is provided with an arcuate slot 90 (Figure 3) concentric with shaft 40, this slot being provided with a series of notches 91 opening from its inner edge. Notches 91 are adapted to receive the inner portion of a pin 92 secured in the hub of pulley 38 and projecting rearward therefrom, the major portion of this pin extending through the slot 90. By turning nut 88 off of rod 81 to a proper extent, the adjusting plate may be moved rearward sufficiently to be disengaged from pin 92, after which, by holding pulley 38 and turning plate 85, rod 82 may be turned so as to vary its angular relation to shaft 40 and effect desired adjustment of the slidable blocks 67 and 71. After the desired adjustment has been effected, plate 85 is returned to normal position with the pin 92 engaging in the notch 91 corresponding to the adjustment thus made, after which nut 88 is turned tightly onto rod 81 for locking the parts together in the manner previously described. It will be seen that the pin 92 and the adjusting plate 85 provide a positive drive connection between rod 81 and shaft 40, assuring rotation of the rod with the shaft and precluding possibility of casual variation in the angular relation therebetween.

A crank pin 95 is secured to the outer or forward arm of block 71 to one side of the axis of shaft 40, which axis coincides with the axis of rod 81, this pin 95 extending forwardly from block 71. A ball bearing structure 96 of known type is disposed with its inner race about pin 95, the outer race of this ball bearing structure having secured thereto in any suitable manner, as by being formed integrally therewith, a connecting member 97 of approximately U-shape in plan. Member 97 receives flattened intermediate portion 98 of a plunger 99 having an upper cylindrical portion 100 slidably mounted in a bushing 101, suitably secured in thickened upper forward portion 102 of housing section 24. Plunger 99 further comprises a lower cylindrical portion 103 slidably mounted through a bushing 104, secured in a sleeve 105 at the front of and integral with a web element 106 forming the lower wall of compartment 65, this web element being integral with upper housing section 24 and with web 51 thereof.

The crank pin 95, ball bearing structure 96 and parts connected thereto constitute a load at one side of the axis of shaft 40. That load, if uncompensated for, would cause objectionable vibration of the machine such as would reduce its maximum efficiency and tend to cause objectionable wear of parts. A counterweight 109, shaped as shown in Figures 1 and 5, is suitably secured, as by means of screws 110, to bight portion 68 of block 67. The counterweight is thus disposed at the opposite side of the axis of shaft 40 from crank pin 95 and ball bearing structure 96 and is effective as a counterbalance therefor, being appropriately designed to that end. Counterweight 109 extends about neck 61 of head 60 as well as about the body portion of this head, being in part slidable on neck 61 and in part slidable on the head 60. That provides effective guide means for the counterweight in the adjustment thereof toward and away from the axis of shaft 40 and eliminates any objectionable play or vibration between parts. It will be seen that shaft 40 and rod 81, together with head 60 and the parts carried thereby, are rotated as a unit for reciprocating plunger 99, the counterweight 109 serving to counterbalance the crank pin 95 and associated parts, the height or depth of the stroke of the plunger, and the length of the stroke thereof, being adjusted as required in the manner previously described.

Bushing 104 extends downward a considerable distance beyond sleeve 105. A supporting sleeve 112 is mounted upon the lower portion of bushing 104 for rotation thereabout while being confined against endwise movement. Supporting sleeve 112 may be mounted on the lower portion of bushing 104 in the manner disclosed in Woodward Patent No. 1,949,509, or in any other suitable manner. The particular mounting of supporting sleeve 112 is not of the essence of my invention, and it suffices to state that this sleeve is suitably mounted for rotation about bushing 104 while being confined against endwise movement.

Supporting sleeve 112 is provided, at one side thereof, with a lengthwise arcuate groove 113 and, at the opposite sides of this groove, with flat faces 114. Outer arms 115 of a three armed plate 116 seat upon faces 114 and are clamped between the latter and flanges 117 of a cap plate 118. The latter plate comprises an arcuate body 119 which, with groove 113, defines a substantially cylindrical vertical passage, and the flanges 117 suitably secured, as by means of screws 120, to supporting sleeve 112.

Plate 116 is formed of spring steel, center arm 121 thereof providing a leaf spring which is riveted or otherwise secured in the slotted upper end of a guide rod 122. The upper portion of rod 122 extends through the cylindrical passage defined by groove 113 and body 119 of cap plate 118, with its inner portion contacting supporting sleeve 112 at groove 113 therein, when arm 121 of plate 116 is in its normal vertical position. Body 119 of plate 118 normally is spaced outward a slight distance from guide rod 122, permitting the latter to be swung outward in a direction away from supporting sleeve 112, such outward movement of rod 122 being positively limited by contact with the body portion of cap plate 118.

Guide rod 122 is bored out from its lower end, being of tubular construction below the slot therein which receives arm 121 of plate 116, as will be clear from Figures 7 and 8. An oil hole 123 opens into the upper end of the tubular portion of rod 122, this oil hole normally being covered by a grooved collar 124 slidable on rod 122. Collar 124 is releasably held in normal position by a wire spring 125 secured at one end, as by means of one of the screws 120, to cap plate 118. An oiling wick 126 is mounted within rod 122, in contact with relatively short wicks 127 disposed in openings extending radially through the wall of rod 122, for a purpose which will be explained presently.

A cutting tool guide member 128 is mounted in the lower portion of guide rod 122. Member 128 comprises a shank 129 pivoted at its upper end in rod 122, by a pin 130, and a foot 131 at the lower end of shank 129, this foot comprising a heel 132 and a toe 133. Foot 131 operates in slots 134 in rod 122, extending from the lower end thereof. At its inner end toe 133 is provided with a V-shaped upwardly and outwardly inclined slot 135 disposed to receive the outer edge portion of a cutting tool, such as a chisel. A leaf spring 136 of generally hair pin form is disposed within the lower portion of guide rod 122 and confined between the adjacent wall thereof and the outer face of shank 129 of guide member 128. Spring 136 yieldingly urges the guide member 128 inward about pivot pin 130, so as to maintain toe 133, at groove 135, in contact with the cutting tool, as will be explained more fully presently.

A guide sleeve 138 is slidably mounted on rod 122 for vertical reciprocation thereon. The oiling wicks 126 and 127 provide means for lubricating the contacting surfaces of sleeve 138 and rod 122, as well as for supplying lubricant to the contacting surfaces of pivot pin 130 and the upper end portion of shank 129 of the tool guide member 128. Sleeve 138 carries a tool block 140 conveniently formed integrally with this sleeve. Block 140 is provided with a vertically extending socket for reception of the shank portion of a cutting tool, such as chisel 141, secured in block 140 by suitably disposed set screws 142. Block 140 is further provided with an inwardly extending finger 143 having in its inner end an arcuate groove 144 shaped to fit about a reduced neck 145 at the lower end of plunger 99, which extends downward beyond the supporting sleeve 112, as will be clear from Figures 1 and 2. The lateral portions of finger 143 provide elements disposed between shoulder 146 at the upper end of neck 145 and an abutment member 147 suitably secured about the lower end of neck 145, conveniently formed integrally therewith. Sleeve 138 is thus connected to plunger 99 for reciprocation therewith, while being capable of swinging movement toward and away from the plunger substantially radially thereof. In the movement of the machine over the work the cutting tool or chisel 141 is reciprocated and, being eccentric to plunger 99, trails the latter, supporting sleeve 112 swinging about the axis of plunger 99 in accordance with changes in direction of movement of the machine, permitting the chisel to follow accurately the line or pattern being cut.

In practice the work w is placed upon a suitable support s and the machine is moved over the work in such manner as to move the cutting tool or chisel 141 along a line or pattern to which the material or work w is to be cut. When the chisel 141 is out of the work it is in vertical position, as shown in Figure 10, that is, in position perpendicular to the work. When the chisel enters the work on its down stroke, however, in the continued forward movement of the machine along the cutting line, the chisel is caused to assume the inclined position shown in Figure 11. To permit of that, the guide rod 122 swings outward away from the reciprocating plunger 99, substantially radially of the latter, this swinging movement of the guide rod being permitted by the spring 121. Such outward movement of guide rod 122 is limited by cap plate 118, as above explained, but is sufficient to accommodate the required movement of the chisel. When the chisel is again withdrawn from the work w on its upstroke, guide rod 122, and with it the chisel 141, is returned to vertical position, shown in Figure 10, and then follows the succeeding or cutting stroke of the chisel. The ability of the chisel to assume the inclined position of the Fig. 11, when subjected to outward pressure resulting from continued movement of the machine when the chisel is in the work, avoids subjecting the chisel to objectionable stresses with resulting bending or breakage thereof, while permitting movement of the machine over the work at increased speed and with increased smoothness, which increases the efficiency of the machine. But slight clearance between finger 143 and abutments 146 and 147 is required to permit of the outward and inward swinging movements of guide rod 122. That slight clearance is not objectionable in practice but, if desired, may be obviated by so forming abutments 146 and 147 and finger 143 as to maintain close contact therebetween at all times, as will be readily understood.

During the cutting operation small particles or chips of the work or material being operated upon will be produced. It is desirable that these chips be removed as produced, to avoid objectionable obscuring of the line or pattern to be cut. To that end I provide front wall 22 of the the lower housing section 21 with an opening 150. A plate 151 is disposed at the front face of wall 22 and is detachably secured thereto by spring clips 152, of known type, secured to the rearward face of plate 151 and engaging in back of the adjacent portions of wall 22. Plate 151 is provided with a hood element 152 defining an opening 153 adjacent the lower end of guide rod 122. The electric motor 30 is provided with means of known type for circulating cooling air therethrough, comprising openings 154 in the ends of the motor casing and a suitable fan 155 secured to the motor shaft for rotation therewith. Fan 155 is so disposed that air is drawn through the motor 30 from the rear thereof and discharged through openings 154 at the front of the motor, certain of these openings being aligned with opening 153 of plate 151, as will be clear from Figures 1 and 2. The air discharged through opening 153 serves to blow away any chips or small particles of material produced during the cutting operation.

Two electric lamps 156 are mounted within lower housing section 21, at opposite sides of motor 30, by means of brackets 157. These lamps are of known type and are suitably connected to the motor circuit so as to be controlled by the motor switch 46. Suitable fittings may be provided for oiling the motor and other moving parts of the machine.

I claim:

1. In a cutting machine of the character described, a drive shaft, a reciprocating plunger, a crank pin carried by said shaft having operating connection to said plunger, a counterweight carried by said shaft opposed to said pin, and means for adjusting said pin and said counterweight toward and away from the axis of said shaft.

2. In a cutting machine of the character described, a drive shaft, a reciprocating plunger, a crank pin carried by said shaft having operating connection to said plunger, a counterweight carried by said shaft opposed to said pin, and means for simultaneously moving said pin and said counterweight in opposite directions toward and away from the axis of said shaft and securing them in adjustment.

3. In a cutting machine of the character described, a drive shaft, a reciprocating plunger, a crank pin carried by said shaft having operating connection to said plunger, a counterweight carried by said shaft opposed to said pin, and means for simultaneously moving said pin and said counterweight in opposite directions and to the same extent toward and away from the axis of said shaft and securing them in adjustment.

4. In a cutting machine of the character described, a drive shaft, a reciprocating plunger adjacent one end of said shaft, a crank pin mounted on said end of said shaft for relative movement along a diameter thereof, a counterweight opposed to said pin mounted on said one end of said shaft for relative movement along said diameter, means otherwise confining said pin and counterweight against movement across said shaft, and means for simultaneously moving said pin and counterweight in opposite directions and to equal extent along said diameter toward and away from the axis of said shaft and securing them in adjustment.

5. In a cutting machine of the character described, a tubular drive shaft provided at one end with a fixed head having a transverse groove therein, a rod mounted through said shaft adjustable on the axis thereof, a slotted block closed at its ends slidable in said groove, a second slotted block closed at its ends slidable in said groove at the outer face of said first block, a crank pin carried by said second block at one side of the axis of said shaft, a reciprocating plunger, operating connections between said plunger and said pin, a counterweight carried by said first block at the other side of the axis of said shaft, two oppositely disposed eccentrics fixed to said rod operating in said blocks in contact with the end walls thereof, and means for forcing said rod through said shaft toward the other end of the latter and establishing releasable driving connections between said shaft and rod for permitting angular adjustment of the latter relative to said shaft.

6. In a cutting machine of the character described, a tubular drive shaft having a head fixed thereto at one end, a block slidably mounted in said head for movement transversely thereof and for rotation therewith, a second block slidably mounted in said head at the outer face of said first block for movement parallel with the latter transversely of and for rotation with said head, a rod extending through said shaft adjustable about the axis thereof, said rod and blocks having cooperating means for adjusting said blocks in opposite relation transversely of said head by turning of said rod relative to said shaft, an adjusting member mounted on said rod having positive connection therewith for turning said rod, a reciprocating plunger, operating connections between said plunger and said second block at one side of the axis of said shaft, a counterweight carried by said first block at the opposite side of said axis, and means for releasably and positively securing said adjusting member to said shaft for rotation therewith.

7. In a cutting machine of the character described, a tubular drive shaft having a head fixed thereto at one end, said head having a transverse groove opening from its outer face, a block slidably mounted in said groove, a second block slidably mounted in said groove on said first block, a rod extending through said shaft adjustable about the axis thereof and slidable therein, said rod and blocks having cooperating means for adjusting said blocks in opposite relation transversely of said head by turning of said rod relative to said shaft and for clamping said blocks to said head by moving said rod through said shaft toward the other end thereof, an adjusting member on said rod having positive connection therewith for turning said rod, a reciprocating plunger, operating connections between said plunger and said second block at one side of the axis of said shaft, a counterweight carried by said first block at the opposite side of said axis, and means for releasably and positively securing said adjusting member to said shaft for rotation therewith and for forcing said rod through said shaft toward said other end of the latter.

8. In a cutting machine of the character described, a tubular drive shaft having a head fixed thereto at one end, said head having a transverse groove opening from its outer face, a block slidably mounted in said groove, a second block slidably mounted in said groove on said first block, a rod extending through said shaft adjustable about the axis thereof and slidable therein, said rod and blocks having cooperating means for adjusting said blocks in opposite relation transversely of said head by turning of said rod relative to said shaft and for clamping said blocks to said head by moving said rod through said shaft toward the other end thereof, an adjusting member on said rod having positive connection therewith for turning said rod, a reciprocating plunger, operating connections between said plunger intermediate the ends thereof and said second block at one side of the axis of said shaft, a counterweight carried by said first block at the opposite side of said axis, and means for releasably and positively securing said adjusting member to said shaft for rotation therewith and for forcing said rod through said shaft toward said other end of the latter.

9. In a cutting machine of the character described, a tubular drive shaft having a head fixed thereto at one end, a block slidably mounted in said head for movement transversely thereof and for rotation therewith, a second block slidably mounted in said head at the outer face of said first block for movement parallel with the latter transversely of and for rotation with said head, a rod extending through said shaft adjustable about the axis thereof, said rod and blocks having cooperating means for adjusting said blocks in opposite relation transversely of said head by turning of said rod relative to said shaft, an adjusting member mounted on said rod having positive connection therewith for turning said rod, a reciprocating plunger, operating connections between said plunger and said second block at one side of the axis of said shaft, a counterweight carried by said first block at the opposite side of said axis, said counterweight in part fitting about and guided by said head, and means for releasably and positively securing said adjusting member to said shaft for rotation therewith.

10. In a cutting machine of the character described, a reciprocating plunger, a guide rod parallel with and spaced substantially radially outward from said plunger, means supporting said rod for movement concentrically about said plunger and for movement toward and away from said plunger substantially radially thereof, said supporting means comprising means yieldingly opposing movement of said rod away from said plunger, a sleeve slidable on said rod, a tool block carried by said sleeve having tool receiving and securing means eccentric to said plunger, a guide member carried by said rod having an element disposed to receive and guide a tool secured in said block, and means connecting said block to said plunger for reciprocation therewith and for relative movement toward and away from said plunger substantially radially thereof.

11. In a cutting machine of the character described, a reciprocating plunger, a supporting sleeve confined against endwise movement rotatable about said plunger, a guide rod disposed outward of said plunger substantially radially thereof, means supporting said rod from said sleeve yieldingly opposing outward movement of said rod away from said plunger, a guide sleeve slidable on said rod, a tool block carried by said guide sleeve having tool receiving and securing means eccentric to said plunger, a guide member carried by said guide rod disposed to receive the outer portion of a tool secured to said block, and means connecting said block to said plunger for reciprocation therewith and for relative substantially radial movement toward and away from said plunger.

12. In a cutting machine of the character described, a reciprocating plunger, a supporting sleeve confined against endwise movement rotatable about said plunger, a guide rod disposed outward of said plunger substantially radially thereof, means supporting said rod from said sleeve yieldingly opposing outward movement of said rod away from said plunger, a guide sleeve slidable on said rod, a tool block carried by said guide sleeve having tool receiving and securing means eccentric to said plunger, a guide member pivoted to said guide rod for relative movement toward and away from said plunger and disposed to receive a tool carried by said block, means yieldingly opposing outward movement of said guide member away from said plunger, and means connecting said block to said plunger for reciprocation therewith and for relative substantially radial movement toward and away from said plunger.

13. In a cutting machine of the character described, a vertically reciprocating plunger provided at its lower end portion with two vertically spaced abutments, a supporting sleeve confined against endwise movement rotatable about said plunger, a guide rod disposed outward of said plunger substantially radially thereof, means supporting said rod from said sleeve yieldingly opposing outward movement of said rod away from said plunger, a guide sleeve slidable on said rod, a tool block carried by said guide sleeve having tool receiving and securing means eccentric to said plunger, said block being provided at its inner end with means extending between said abutments contacting the latter for reciprocating said block with said plunger while permitting relative movement of said block toward and away from said plunger substantially radially thereof, and a guide member carried by said guide rod provided with an element disposed to receive and guide the lower portion of a tool carried by said block.

14. In a cutting machine of the character described, a vertically reciprocating plunger provided at its lower end portion with two vertically spaced abutments, a supporting sleeve confined against endwise movement rotatable about said plunger, a guide rod disposed outward of said plunger substantially radially thereof, a leaf spring secured to said sleeve and to the upper end of said rod supporting the latter from said sleeve and yieldingly opposing movement of said rod away from said plunger, a guide sleeve slidable on said rod, a tool block carried by said guide sleeve having tool receiving and securing means eccentric to said plunger, said block being provided at its inner end with a vertical groove receiving said plunger and defining elements extending between said abutments for contact therewith, and a guide member carried by said guide rod provided with an element disposed to receive and guide the lower portion of a tool carried by said block.

15. In a cutting machine of the character described, a vertically reciprocating plunger provided at its lower end portion with two vertically spaced abutments, a supporting sleeve confined against endwise movement rotatable about said plunger, a guide rod disposed outward of said plunger substantially radially thereof, a leaf spring secured to said sleeve and to the upper end of said rod supporting the latter from said sleeve and yieldingly opposing movement of said rod away from said plunger, a guide sleeve slidable on said rod, a tool block carried by said guide sleeve having tool receiving and securing means eccentric to said plunger, said block being provided at its inner end with a vertical groove receiving said plunger and defining elements extending between said abutments for contact therewith, a guide member pivoted to said rod for relative movement toward and away from said plunger, said rod and guide member having cooperating means guiding relative inward movement of said guide member, the latter being provided at its lower end with a guide element disposed to receive and guide the outer portion of a tool carried by said block, and yielding means urging said guide member inward toward said plunger.

WILLIAM P. GALLAGHER.